United States Patent
Kim

(10) Patent No.: US 12,491,852 B2
(45) Date of Patent: Dec. 9, 2025

(54) BRAKING APPARATUS FOR VEHICLE

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 208 days.

(21) Appl. No.: 18/074,113

(22) Filed: Dec. 2, 2022

(65) Prior Publication Data

US 2023/0415717 A1    Dec. 28, 2023

(30) Foreign Application Priority Data

Jun. 22, 2022    (KR) .................. 10-2022-0076218

(51) Int. Cl.
*B60T 8/92*        (2006.01)
*B60T 13/58*      (2006.01)

(52) U.S. Cl.
CPC .............. *B60T 8/92* (2013.01); *B60T 13/58* (2013.01); *B60T 2270/10* (2013.01); *B60T 2270/402* (2013.01); *B60T 2270/413* (2013.01); *B60T 2270/414* (2013.01)

(58) Field of Classification Search
CPC ...... B60T 13/662; B60T 13/741; B60T 13/74; B60T 13/58; B60T 8/92; B60T 2270/10; B60T 2270/413; B60T 2270/402; B60T 2270/414
See application file for complete search history.

(56) References Cited

U.S. PATENT DOCUMENTS

| | | | | |
|---|---|---|---|---|
| 2006/0116803 A1* | 6/2006 | Armbruster | ......... | G06F 11/2038 701/1 |
| 2008/0021623 A1* | 1/2008 | Frey | ................. | B60T 8/321 701/70 |
| 2011/0168502 A1* | 7/2011 | Linhoff | ................. | B60T 13/588 303/3 |
| 2015/0266457 A1* | 9/2015 | Johnson | ................. | B60T 7/042 303/15 |
| 2019/0248354 A1* | 8/2019 | Andrea | ................. | B60T 13/741 |
| 2020/0114888 A1* | 4/2020 | Michels | ................ | B60T 8/4077 |

* cited by examiner

*Primary Examiner* — Stephen Holwerda
(74) *Attorney, Agent, or Firm* — NovoTechIP International PLLC

(57) ABSTRACT

A braking apparatus for a vehicle is disclosed herein. According to an embodiment of the present disclosure, a braking apparatus for a vehicle is provided, the apparatus including: a front wheel braking unit configured to brake a front wheel of the vehicle; a rear wheel braking unit configured to brake a rear wheel of the vehicle using an electro-mechanical brake; a main control unit configured to control the front wheel braking unit using hydraulic pressure and to transfer a braking command to the rear wheel braking unit; and an auxiliary control unit configured to enable redundancy control of the rear wheel braking unit, wherein the front wheel braking unit further comprises at least one electronic parking brake caliper disposed on the front wheel, and wherein the electronic parking brake caliper is connected to the auxiliary control unit and controlled by the redundancy control unit.

11 Claims, 2 Drawing Sheets

BRAKING APPARATUS FOR VEHICLE

CROSS-REFERENCE TO RELATED APPLICATIONS

The present application is based on and claims the benefit of priority to Korean Patent Application Number 10-2022-0076218, filed on Jun. 22, 2022 in the Korean Intellectual Property Office, the entire disclosure of which is incorporated herein by reference.

TECHNICAL FIELD

The present disclosure relates to a braking apparatus for a vehicle.

BACKGROUND

The description in the present section merely provides background information related to the present disclosure and does not necessarily constitute related art.

An electro-mechanical brake is a device, on which a caliper, drum, and motor-driven actuator are mounted, that generates braking force without using hydraulic pressure. Recently, a hybrid electro-mechanical brake system that is a mixture of an electro-hydraulic brake (EHB) and an electro-mechanical brake has been developed. In a vehicle with the hybrid electro-mechanical brake system, the front wheels may be braked using the EHB, and the rear wheels may be braked using the electro-mechanical brake.

The hybrid electro-mechanical brake system may implement electrical redundancy. For example, when a fault occurs in a rear wheel electro-mechanical brake system, emergency braking is performed using front wheel hydraulic braking. Meanwhile, when a fault occurs in a front wheel hydraulic braking system, emergency braking may be performed using the rear wheel electro-mechanical brake system. In a case of emergency braking with front wheel hydraulic braking, for example, backup braking performance equivalent to deceleration of 0.6 to 0.7 g may be implemented, whereas in a case of emergency braking only with the rear wheel electro-mechanical brake system, only backup braking performance equivalent to deceleration of 0.3 to 0.4 g may be implemented.

During emergency braking of a vehicle, the dynamic load of the vehicle may be applied by inertia force of the vehicle to the front wheels. Accordingly, regardless of the performance of a rear wheel electro-mechanical brake actuator, a situation in which the friction force between the rear wheels and the road surface is insufficient may occur. In case of emergency braking, even when large braking force is provided to the vehicle by the rear wheel electro-mechanical brake actuator, a wheel lock phenomenon occurs in the rear wheels, thereby deteriorating the braking performance of the vehicle.

SUMMARY

According to an embodiment of the present disclosure, a braking apparatus for a vehicle is provided, the apparatus including: a front wheel braking unit configured to brake a front wheel of the vehicle; a rear wheel braking unit configured to brake a rear wheel of the vehicle using an electro-mechanical brake; a main control unit configured to control the front wheel braking unit using hydraulic pressure and to transfer a braking command to the rear wheel braking unit; and a redundancy control unit configured to enable redundancy control of the rear wheel braking unit, wherein the front wheel braking unit further comprises at least one electronic parking brake caliper disposed on the front wheel, and wherein the electronic parking brake caliper is connected to the redundancy control unit and controlled by the redundancy control unit.

DETAILED DESCRIPTION

Figure 1:
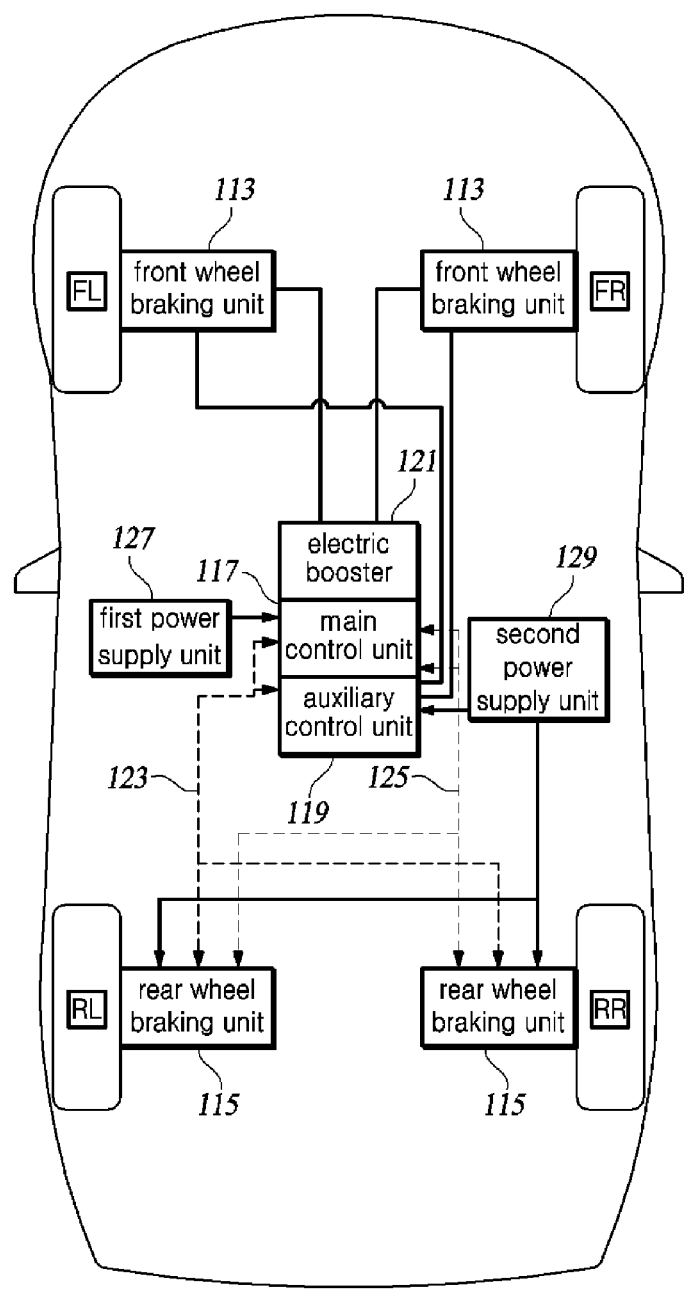
FIG. 1 is a configuration diagram illustrating a braking apparatus for a vehicle according to an embodiment of the present disclosure.

A braking apparatus for a vehicle according to an embodiment may increase backup braking performance of a hybrid braking system based on a rear wheel electro-mechanical brake.

The braking apparatus for the vehicle according to an embodiment may implement backup braking performance of, for example, deceleration of 0.5 or 0.65 or more.

The braking apparatus for the vehicle according to an embodiment may increase the redundancy braking performance of the front wheels and the rear wheels to increase driving stability.

The aspects of the present disclosure are not limited to those mentioned above, and other aspects not mentioned herein will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is a configuration diagram illustrating a braking apparatus for a vehicle according to an embodiment of the present disclosure.

Referring to FIG. 1, a braking apparatus 100 for a vehicle may include all or some of a front wheel braking unit 113, a rear wheel braking unit 115, a main control unit 117 (ECU: Electronic Control Unit), an auxiliary control unit 119 (RCU: Redundancy Control Unit), an electric booster 121, a first communication line 123, a second communication line 125, a first power supply unit 127, and a second power supply unit 129.

The front wheel braking unit 113 may be disposed on a plurality of front wheels provided on one side of a vehicle.

According to an embodiment of the present disclosure, the front wheel braking unit 113 may be configured to brake a front wheel unit of the vehicle by using hydraulic pressure and may use an electronic parking brake caliper (not shown). Herein, in an electronic parking brake, when an electronic parking brake switch (not shown) is operated, a motor (not shown) of the electronic parking brake caliper is driven to generate parking braking force of the vehicle.

Since the front wheel braking unit 113 may perform a parking brake function using the electronic parking brake caliper, the electronic parking brake function in an electro-mechanical brake of the rear wheel braking unit 115 may be excluded from the configuration of an embodiment of the present disclosure.

The auxiliary control unit 119 may be electrically connected to the front wheel braking unit 113. For example, the electronic parking brake caliper may be connected to the auxiliary control unit 119 by DC power. The auxiliary control unit 119 may apply the supplied power to the electronic parking brake caliper to generate braking force.

In a case of emergency braking of a vehicle, the frictional force between the tires of the front wheels and the road surface increases because the dynamic load of the vehicle may be applied to the front wheel unit by inertia forces of the vehicle.

The rear wheel braking unit 115 may be disposed on a plurality of rear wheels provided on the other side of a vehicle.

The rear wheel braking unit 115 may be configured to brake the rear wheel unit of a vehicle and may use an electro-mechanical brake. Here, the electro-mechanical brake is an apparatus that generates braking force without using hydraulic pressure by having an actuator (not shown) based on driving of a motor (not shown), a caliper (not shown), and a drum (not shown) mounted therein.

The rear wheel braking unit 115 may include a wheel control unit (BWCU: Brake Wheel Control Unit, not shown). The wheel control unit of the rear wheel braking unit 115 may receive a braking signal from the main control unit 117 to drive the motor of the electro-mechanical brake.

The wheel control unit of the rear wheel braking unit 115 may independently receive a braking signal and decide a braking command. For example, when the wheel control unit of the rear wheel braking unit 115 is connected to a pedal sensor, the wheel control unit may receive a pedal signal from the pedal sensor and decide the braking command based on the received pedal signal. The wheel control unit may brake the rear wheel braking unit 115 by transferring the braking command decided based on the pedal signal to the rear wheel braking unit 115.

In case of emergency braking of a vehicle, the frictional force between the tires of the rear wheels and the road surface decreases because the dynamic load of the vehicle may be applied by inertia force to the front wheel unit. Accordingly, even when the rear wheel braking unit 115 generates large braking force, a wheel lock phenomenon may occur in the rear wheels.

The main control unit 117 may control the electric booster 121 connected to the front wheel braking unit 113 by a hydraulic line. The electric booster 121 may boost depression force when the depression force is applied to a pedal to decelerate a driving vehicle or maintain the parking state of a vehicle.

The main control unit 117 may decide a braking command for the front wheels based on the pedal signal, and may brake the front wheel braking unit 113 via the electric booster 121. Herein, when the main control unit 117 brakes the front wheel braking unit 113, a hydraulic method may be used.

The main control unit 117 may calculate braking force required for the rear wheels and transfer a braking signal corresponding to the braking force to the rear wheel braking unit 115.

When the main control unit 117 fails, the auxiliary control unit 119 may perform emergency braking using the rear wheel braking unit 115. When the auxiliary control unit 119 performs emergency braking using the rear wheel braking unit 115, the auxiliary control unit 119 calculates the braking force required for the rear wheel braking unit 115 and transfers the calculated braking signal to the wheel control unit of the rear wheel braking unit 115. The wheel control unit of the rear wheel braking unit 115 may perform braking based on a braking signal received from the auxiliary control unit 119.

When the main control unit 117 fails, the auxiliary control unit 119 applies power to the front wheel braking unit 113 and controls the front wheel braking unit 113 to perform emergency braking. Herein, the auxiliary control unit 119 may directly apply power to the electronic parking brake caliper of the front wheel braking unit 113 to generate braking force.

The main control unit 117 may use a communication unit to transmit and receive braking signals to and from the auxiliary control unit 119 and the rear wheel braking unit 115.

The communication unit may be duplexed into a first communication line 123 and a second communication line 125 to configure communication redundancy. For example, when an abnormality occurs in the first communication line 123, the main control unit 117, the auxiliary control unit 119, and a rear wheel driving unit may transmit/receive a braking signal using the second communication line 125.

The first communication line 123 and the second communication line 125 may use, for example, local controller area network (CAN) communication.

When an abnormality occurs in both the first communication line 123 and the second communication line 125, the main control unit 117 may calculate braking force required for the front wheels and transfer a braking signal based on the calculated braking force to the integrated electric booster 121 to brake the front wheel braking unit 113 in a hydraulic manner. In addition, the auxiliary control unit 119 may apply power to the front wheel braking unit 113 to control the electronic parking brake caliper of the front wheel braking unit 113 to perform emergency braking. When braking a vehicle only with the braking force of the front wheel braking unit 113, for example, in a situation in which a backup braking performance of deceleration of 0.65 or more is able to be implemented, the communication unit may be unified.

The main control unit 117, the auxiliary control unit 119, and the rear wheel braking unit 115 may be connected to a plurality of power supply units to receive power. The plurality of power supply units may include a first power supply unit 127 and a second power supply unit 129.

The first power supply unit 127 may be configured to supply power to the main control unit 117. The second power supply unit 129 may be configured to supply power to the auxiliary control unit 119 and the rear wheel braking unit 115.

When an abnormality occurs in the first power supply unit 127, the auxiliary control unit 119 may apply the power supplied from the second power supply unit 129 to the electronic parking brake caliper of the front wheel braking unit 113 to control the front wheel braking unit 113.

When an abnormality occurs in the second power supply unit 129, the main control unit 117 may calculate the braking force required for the front wheels, and transfer a braking signal to the integrated electric booster 121 based on the calculated braking force to brake the front wheel braking unit 113 in a hydraulic manner.

Although the plurality of power supply units are duplexed into the first power supply unit 127 and the second power supply unit 129, the number of power supply units is not necessarily limited to two.

Figure 2A:
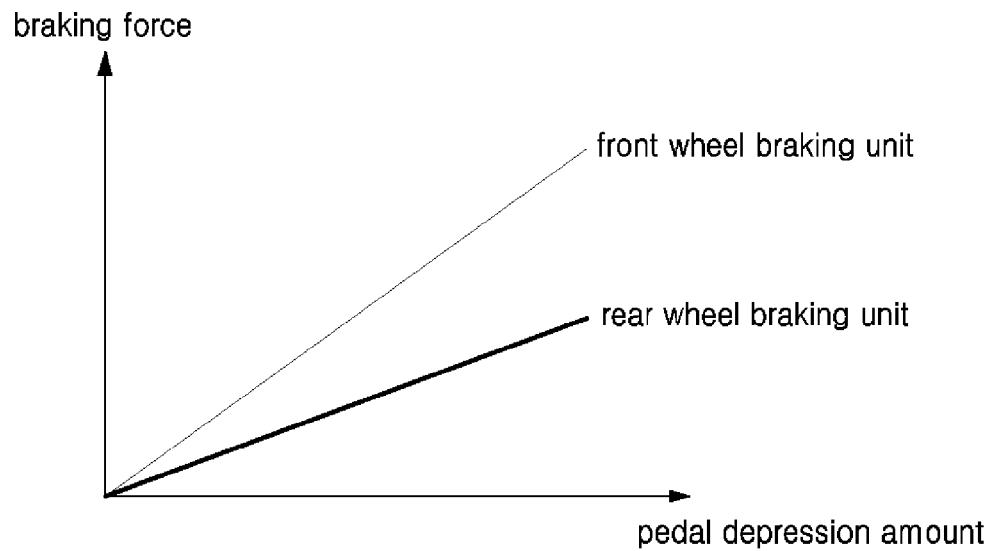
FIG. 2A is a graph showing the braking force according to a pedal depression amount of a front wheel braking unit and a rear wheel braking unit according to the related art.

FIG. 2A is a graph showing the braking force according to a pedal depression amount of the front wheel braking unit 113 and the rear wheel braking unit 115 according to the related art.

Figure 2B:
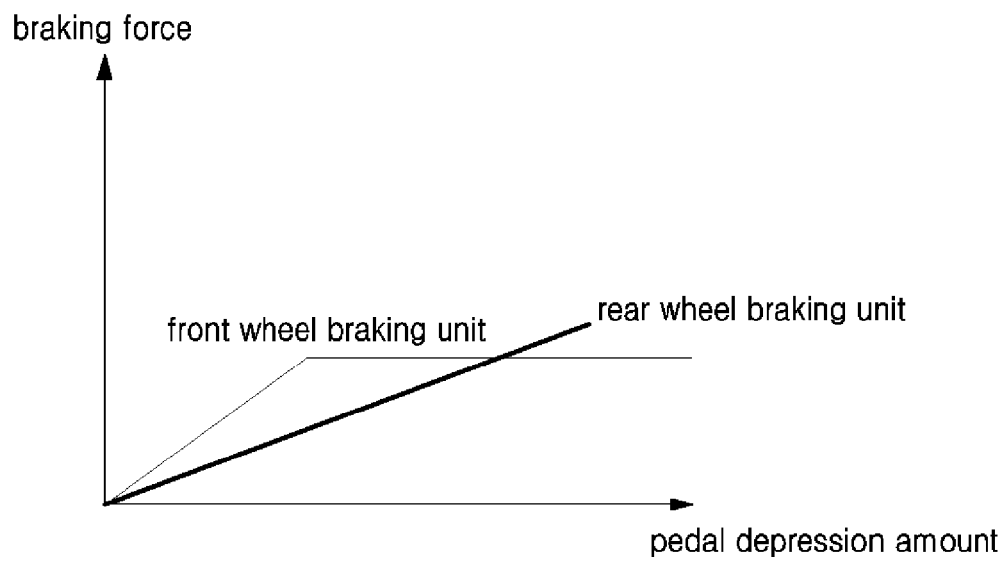
FIG. 2B is a graph showing the braking force according to a pedal depression amount of a front wheel braking unit and a rear wheel braking unit when the braking force of the front wheel braking unit is limited according to an embodiment of the present disclosure.

FIG. 2B is a graph showing the braking force according to a pedal depression amount of the front wheel braking unit 113 and the rear wheel braking unit 115 when the braking force of the front wheel braking unit 113 is limited according to an embodiment of the present disclosure.

Referring to FIG. 2A, in a case of emergency braking of a vehicle, the dynamic load of the vehicle is applied to the front wheel unit to increase the frictional force between the front wheel and the road surface, whereas the frictional force between the rear wheel and the road surface decreases.

In case of emergency braking of a vehicle, the braking force of the front wheel braking unit 113 may be greater than that of the rear wheel braking unit 115. Here, the backup braking performance of the front wheel braking unit 113 may be implemented, for example, equivalent to deceleration of 0.6 to 0.7 g, and the backup braking performance of the rear wheel braking unit 115 may be implemented, for example, equivalent to deceleration of 0.3 to 0.4 g.

When the braking force of the front wheel braking unit 113 is greater than that of the rear wheel braking unit 115, a wheel lock phenomenon may occur in the rear wheels regardless of the braking response and braking performance of the rear wheel braking unit 115. When the wheel lock phenomenon occurs in the rear wheels before the front wheels, the balance of a vehicle is lost, which may cause a dangerous situation such as a spin phenomenon or a drift phenomenon (a sideways tilt phenomenon) of a vehicle body.

Referring to FIG. 2B, the auxiliary control unit 119 may limit the braking force of the front wheel braking unit 113 in order to enhance the braking performance of a vehicle.

In case of emergency braking of a vehicle using the electronic parking brake caliper of the front wheel braking unit 113, the auxiliary control unit 119 may transfer a braking signal to the rear wheel braking unit 115 to implement the braking force of the rear wheel braking unit 115 to be equivalent to, for example, deceleration of 0.4 g.

When the braking force is generated to the front wheel braking unit 113 and the rear wheel braking unit 115, the auxiliary control unit 119 may implement the sum of the braking force to be equivalent to, for example, deceleration of 0.65 g. Accordingly, the auxiliary control unit 119 may generate the braking force of the front wheel braking unit 113 by limiting deceleration to be equivalent to, for example, 0.25 g.

In case of emergency braking of a vehicle using the electronic parking brake caliper of the front wheel braking unit 113, the auxiliary control unit 119 may limit the braking force of the front wheel braking unit 113 to prevent a wheel lock phenomenon of the rear wheels, and the vehicle may implement a backup performance equivalent to, for example, deceleration of 0.65 g.

In case of emergency braking of a vehicle on a road where the kinetic friction force of the vehicle is smaller than the static friction force between a tire and a road surface, for example, on a low friction road, the auxiliary control unit 119 may determine whether an anti-lock braking system (ABS) operation is required for the vehicle. When the auxiliary control unit 119 determines that the ABS operation is required for the vehicle, the auxiliary control unit 119 may determine whether the braking response of the front wheel braking unit 113 deteriorates the braking performance of the vehicle. For example, when the front wheel braking unit 113 brakes using the electronic parking brake caliper, the braking response of the front wheel braking unit 113 may be slower than that of the rear wheel braking unit 115 braking using an electro-mechanical brake caliper. When the braking response of the front wheel braking unit 113 is slow, the rear wheels perform braking before the front wheels, and the braking performance of the vehicle may be deteriorated.

When the auxiliary control unit 119 determines that the braking response of the front wheel braking unit 113 deteriorates the braking performance of a vehicle, the auxiliary control unit 119 may limit the braking force of the front wheel braking unit 113. Herein, the limited braking force of the front wheel braking unit 113 may be, for example, deceleration of 0.25 g.

When the braking force of the front wheel braking unit 113 is limited, the auxiliary control unit 119 may generate braking force in the rear wheel braking unit 115. Herein, the braking force of the rear wheel braking unit 115 may be generated, for example, equivalent to deceleration of 0.4 g.

In case of emergency braking of a vehicle on a low friction road, the auxiliary control unit 119 may limit the braking force of the front wheel braking unit 113 and use the braking force of the front wheel braking unit 113 and the rear wheel braking unit 115 to implement, for example, a braking performance equivalent to deceleration of 0.65 g.

When the auxiliary control unit 119 limits the braking force of the front wheel braking unit 113 and generates braking force using the braking force of the front wheel braking unit 113 and the rear wheel braking unit 115, it is possible to minimize the ABS operation of a vehicle that performs emergency braking on a low friction road.

According to an embodiment of the present disclosure, the braking apparatus 100 for the vehicle may increase backup braking performance of a hybrid braking system based on a rear wheel electro-mechanical brake.

According to an embodiment of the present disclosure, the braking apparatus 100 for the vehicle may implement backup braking performance of, for example, deceleration of 0.5 or 0.65 or more.

According to an embodiment of the present disclosure, the braking apparatus 100 for the vehicle may increase the redundancy braking performance of front wheels and the rear wheels to increase driving stability.

Each component of the device or method according to an embodiment of the present disclosure may be implemented by hardware, software, or a combination of hardware and software. In addition, the function of each component may be implemented by software and the microprocessor may be implemented to execute the function of software corresponding to each component.

Various implementations of the systems and techniques described herein may be implemented by digital electronic circuits, integrated circuits, field programmable gate arrays (FPGAs), application specific integrated circuits (ASICs), computer hardware, firmware, software, and/or a combination thereof. These various implementations may include being implemented in one or more computer programs executable on a programmable system. The programmable system includes at least one programmable processor (which may be a special purpose processor or a general purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable recording medium."

The computer-readable recording medium includes all types of recording devices in which data readable by a computer system is stored. These computer-readable recording media may include non-volatile or non-transitory media, such as ROM, CD-ROM, magnetic tape, floppy disk, memory card, hard disk, magneto-optical disk, storage device, etc., and may further include transitory media, such as data transmission medium. In addition, the computer-readable recording medium may be distributed in network-connected computer systems, and the computer-readable code may be stored and executed in a distributed manner.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A braking apparatus for a vehicle, comprising:
a front wheel braking unit configured to receive hydraulic pressure from an electric booster via a hydraulic line to and to generate a braking force to brake a front wheel of the vehicle based on the hydraulic pressure;
a rear wheel braking unit configured to brake a rear wheel of the vehicle using an electro-mechanical brake;
a main control unit configured to control the front wheel braking unit cause the electric booster to supply the hydraulic pressure to the front wheel braking unit via the hydraulic line and to transfer a braking command to the rear wheel braking unit; and
an auxiliary control unit configured to enable redundancy control of the rear wheel braking unit,
wherein the front wheel braking unit further comprises at least one electronic parking brake caliper disposed on the front wheel,
wherein the electronic parking brake caliper is connected to the auxiliary control unit and controlled by the auxiliary control unit, and
wherein the auxiliary control unit performs backup braking to prevent wheel lock on the rear wheels by limiting the braking force generated hydraulically by the front wheel braking unit using the electronic parking brake caliper when the vehicle performs emergency braking.

2. The braking apparatus of claim 1, wherein the braking apparatus further comprises a communication unit capable of transmitting and receiving a braking signal between the main control unit, the auxiliary control unit, and the rear wheel braking unit.

3. The braking apparatus of claim 2, wherein the communication unit is duplexed into a first communication line and a second communication line to configure a communication redundancy system.

4. The braking apparatus of claim 3, wherein the auxiliary control unit controls to implement a preset backup braking performance using the front wheel braking unit when an abnormality occurs in at least one of the first communication line and the second communication line.

5. The braking apparatus of claim 1, further comprising a plurality of power supply units configured to supply power to at least one of the main control unit, the auxiliary control unit, and the rear wheel braking unit.

6. The braking apparatus of claim 5, wherein the plurality of power supply units comprises:
a first power supply unit configured to supply power to the main control unit; and
a second power supply unit configured to supply power to the auxiliary control unit and the rear wheel braking unit.

7. The braking apparatus of claim 6, wherein the auxiliary control unit controls the front wheel braking unit by applying the power supplied from the second power supply unit to the electronic parking brake caliper when the vehicle performs emergency braking.

8. The braking apparatus of claim 6, wherein, when an abnormality occurs in the main control unit and the first power supply unit, the auxiliary control unit applies power to the electronic parking brake caliper to brake the front wheel braking unit and transfers a braking signal to the rear wheel braking unit to control to implement a preset backup braking performance.

9. The braking apparatus of claim 1, wherein, in a case when an anti-lock braking system (ABS) operation is determined to be required when emergency braking using the electronic parking brake caliper, the auxiliary control unit determines whether braking response of the front wheel braking unit is delayed and a braking performance of the vehicle is deteriorated.

10. The braking apparatus of claim 9, wherein, when the braking performance of the vehicle is determined to be deteriorated, the auxiliary control unit limits braking force of the front wheel braking unit to a preset braking force.

11. The braking apparatus of claim 10, wherein, when the braking force of the front wheel braking unit is limited to the preset braking force, the auxiliary control unit generates as much braking force as the preset braking force for the rear wheel braking unit and controls to implement a preset backup braking performance using the braking force of the front wheel braking unit and the rear wheel braking unit.

* * * * *